US008863003B2

(12) United States Patent  (10) Patent No.: US 8,863,003 B2
Kornhall  (45) Date of Patent: Oct. 14, 2014

(54) SYSTEM AND METHOD FOR MESSAGE GROUPING

(75) Inventor: Aron Kornhall, Heidelberg (DE)

(73) Assignee: SAP SE, Walldorf (DE)

( * ) Notice: Subject to any disclaimer, the term of this patent is extended or adjusted under 35 U.S.C. 154(b) by 586 days.

(21) Appl. No.: 12/938,074

(22) Filed: Nov. 2, 2010

(65) Prior Publication Data

US 2012/0110500 A1  May 3, 2012

(51) Int. Cl.
*G06F 3/00* (2006.01)
*G06F 9/54* (2006.01)

(52) U.S. Cl.
CPC ..................................... *G06F 9/546* (2013.01)
USPC ........... 715/739; 715/206; 715/781; 715/804; 715/853

(58) Field of Classification Search
CPC ............ G06F 3/0482; G06F 17/30572; G06F 17/30867; G06F 9/543
USPC .......................... 715/739, 804, 853, 206, 781
See application file for complete search history.

(56) References Cited

U.S. PATENT DOCUMENTS

| 6,249,807 | B1 * | 6/2001 | Shaw et al. ................... 709/206 |
| 6,341,359 | B1 * | 1/2002 | Aiken et al. ................... 714/100 |
| 6,707,472 | B1 * | 3/2004 | Grauman ....................... 715/752 |
| 7,130,885 | B2 * | 10/2006 | Chandra et al. ............... 709/206 |
| 7,181,438 | B1 * | 2/2007 | Szabo ................................... 1/1 |
| 7,203,688 | B2 * | 4/2007 | Hopkins .............................. 1/1 |
| 7,712,133 | B2 * | 5/2010 | Raikar et al. .................... 726/23 |
| 8,327,025 | B2 * | 12/2012 | Codignotto .................... 709/246 |
| 2001/0043683 | A1 * | 11/2001 | Wilson et al. ............... 379/88.16 |
| 2003/0131284 | A1 * | 7/2003 | Flanagan et al. ................ 714/38 |
| 2004/0024784 | A1 * | 2/2004 | Spall et al. .................. 707/104.1 |
| 2005/0188273 | A1 * | 8/2005 | Angelo et al. ................... 714/39 |
| 2005/0192959 | A1 * | 9/2005 | Miyata et al. ...................... 707/5 |
| 2008/0003984 | A1 * | 1/2008 | Kraft et al. ................. 455/412.1 |
| 2008/0165147 | A1 * | 7/2008 | Christie et al. ................ 345/173 |
| 2008/0178122 | A1 * | 7/2008 | Besecker ....................... 715/854 |
| 2009/0254866 | A1 * | 10/2009 | Kugle et al. ................... 715/841 |
| 2010/0251094 | A1 * | 9/2010 | Holm et al. ................... 715/230 |
| 2011/0055914 | A1 * | 3/2011 | Sugahara ........................ 726/12 |
| 2011/0208820 | A1 * | 8/2011 | Bittles et al. .................. 709/206 |
| 2011/0231499 | A1 * | 9/2011 | Stovicek et al. .............. 709/206 |

FOREIGN PATENT DOCUMENTS

WO   WO 2010147269 A1 * 12/2010

* cited by examiner

*Primary Examiner* — Shen Shiau (74) *Attorney, Agent, or Firm* — Kenyon & Kenyon LLP (57) ABSTRACT

Embodiments of the present invention may provide a message handling system for displaying messages in a structured way. The message handling system may store template messages in a table of a database and generate messages using the template messages. The message handling system may further assess a display area for displaying the generated messages and determine whether all of the generated messages can be viewed on the display area without scrolling. If not, the message handling system may determine whether there are more than one type of generated messages. If there are more than one type of generated messages, the message handling system may group the messages based on message types; and display a list of messages in a plurality of message groups. Each message group may be displayed with a representative message and a link for other similar message in the message group.

20 Claims, 7 Drawing Sheets

SYSTEM AND METHOD FOR MESSAGE GROUPING

FIELD

The disclosed subject matter relates to the field of computer systems and, more particularly, to a system and method for displaying large number of messages in a structured way.

BACKGROUND

Modern computer systems typically checks system operations closely. For example, a database system checks all applicable business logics before committing any changes, and an application server providing services to other client systems runs diagnostic checks for communication, available resources, etc.

Figure 1:
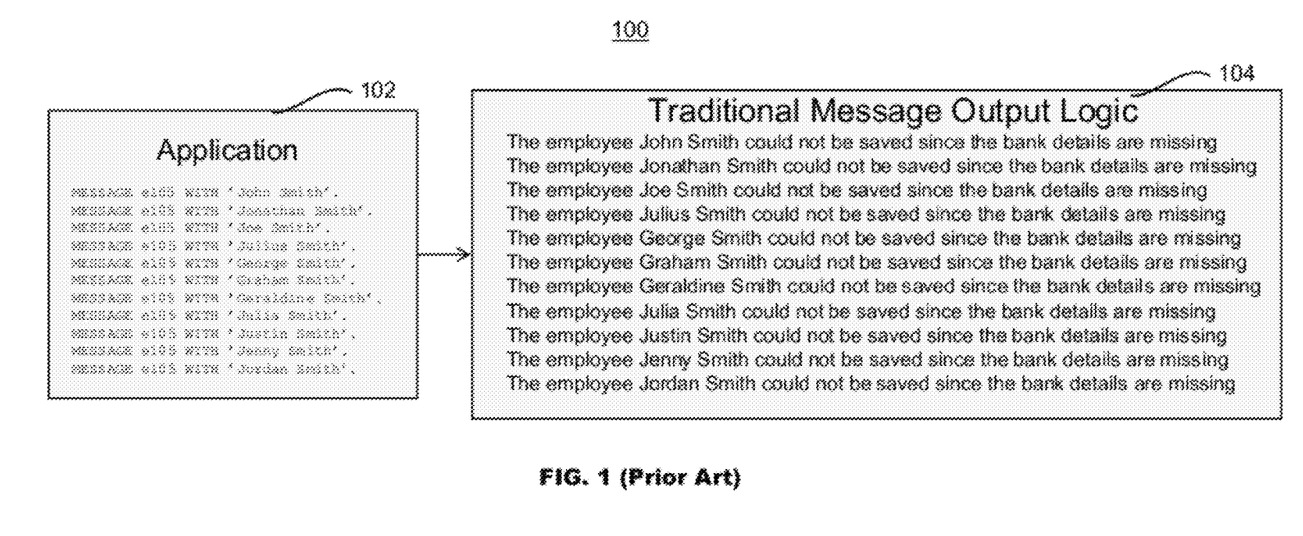
FIG. 1 illustrates a traditional message display.
Figure 2:
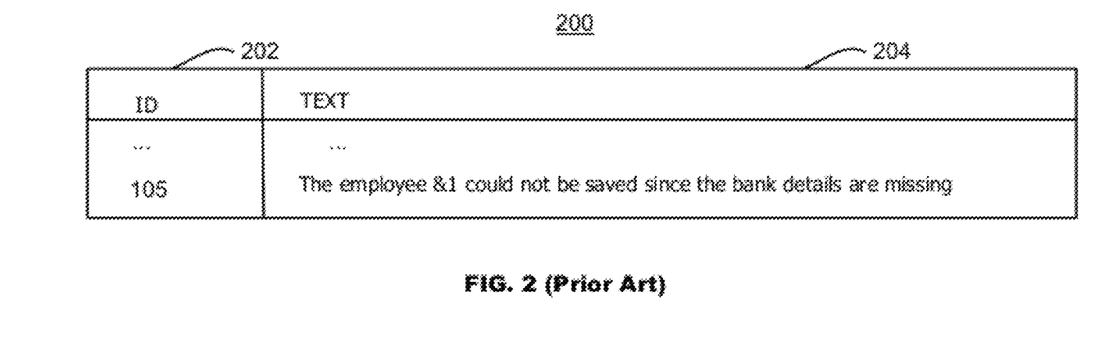
FIG. 2 illustrates a table storing message IDs and descriptive texts.

Graphical user interfaces are widely used to display messages to administrators. Traditionally, system messages (e.g., warning or error messages) are displayed in a list that each describes a message in a short synopsis. For example, FIG. 1 shows a conventional error message output. As shown in FIG. 1, the Application 102 generates a lot of messages with the same message identifier (ID) "e105." Each message is generated with a particular text string (e.g., an employee name) for a parameter. The traditional message output logic 104 displays all error messages in a list. Each message shows a particular employee could not be saved because a required "bank details" are missing. The messages are displayed according to a message template that replaces a place holder with the content of the text string. FIG. 2 shows a database table 200 that stores message templates. The table 200 includes a column for message ID and another column for descriptive text. One saved message template has a message ID of 105 and the detailed descriptive text for a reason why an employee could not be saved. The employee name is a placeholder for a variable that is to be replaced with the parameter value. During runtime, an application generates messages using the message template from the table 200 and provides the value for the variable as shown in FIG. 1.

In some software applications, there are situations where a large number of warning or error messages are generated. This normally happens when a large number of business logics at different levels are implemented as software rules to be checked constantly. For example, at database level, checks on data consistencies are run against any data being saved; at application level, business logics are checked to make sure any operation satisfies the business logic. In such cases, many of the messages are usually caused by the same error. However, since the administrator is drowned in error messages, it is hard to determine the cause of the errors.

For example, FIG. 3 shows a graphical user interface (GUI) 300 in an application for designing an organizational structure. The GUI 300 shows a list of error messages on an upper pane 302 and a design pane 304 for the organizational structure. The list of error messages in the upper pane 302 is so long that an administrator needs to scroll down multiple times to see all messages. The very long list of error messages is not very helpful for finding the root cause and gives the user the impression that many things are wrong.

Accordingly, a need exists for a method and system for an improved display of large number of warning or error messages.

BRIEF DESCRIPTION OF THE DRAWINGS

FIG. 3 illustrates a prior art display of a lot of error messages.

DETAILED DESCRIPTION

Embodiments of the present invention may provide a message handling system for displaying messages in a structured way. In one embodiment, the message handling system may store template messages in a table of a database and generate messages using the template messages. The message handling system may further assess a display area for displaying the generated messages and determine whether all of the generated messages can be viewed on the display area without scrolling. If not, the message handling system may determine whether there is more than one type of generated message. If there is more than one type of generated message, the message handling system may group the messages based on message types; and display a list of messages in a plurality of message groups. Each message group may be displayed with a representative message and a link for other similar message in the message group.

Accordingly, the embodiments of the present invention may present a structured display that makes the message area smarter. If the number of messages is small (e.g., below 5 messages) the messages may be displayed without grouping. However, if the number of messages is large, the messages may be grouped. For example, instead of simply listing all the messages, the messages may be grouped according to type, number and id. In one embodiment, only one of each message type may be displayed in the message area and underneath this message there may be a text stating how many other similar messages there are. By clicking on this text, other similar messages may be displayed.

Figure 4:
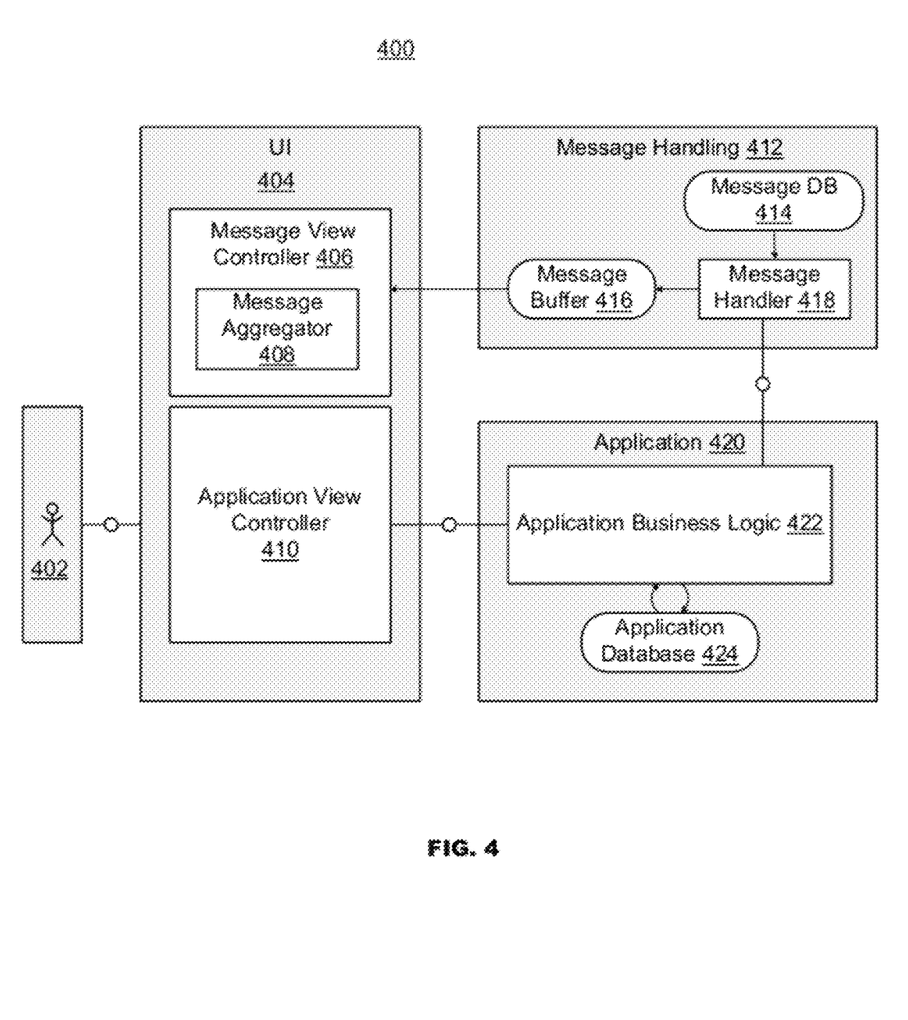
FIG. 4 illustrates a block diagram of an exemplary message handling system according to an embodiment.

FIG. 4 illustrates a block diagram of an exemplary message handling system 400 according to an embodiment. The message handling system 400 may comprise a UI 404, an application 420 and a message handling module 412. The UI 404 may provide an interface to interact with a user 402 and request the application 420 to execute software instructions on behalf of the user 402.

The UI 404 may include a message view controller 406 and an application view controller 410. The application 420 may include an application business logic 422 that contains business logics implemented in software instructions. The application business logic 422 may save data in an application database 424. The application view controller 410 may handle communications between the UI 404 and the application business logic 422. When the user 402 performs actions on the UI 404, the application view controller 410 may interpret the received actions and pass corresponding requests to the application to invoke applicable business logic in the application business logic 422.

The message handling module 412 includes a message buffer 416, a message DB 414 and a message handler 418. The message DB 414 may save message template tables, such as table 200 shown in FIG. 2. If any actions performed by the user 402 lead to errors in the application business logic 422, the application business logic 422 may report the error messages by calling the message handler 418. In one embodiment, the call to the message handler 418 may specify a message ID that uniquely identifies the message to be displayed to the user 402 and provide values for any parameters the identified message may require. The message handler 418 may look up the message DB 414 using the message ID and generate the message to be displayed by replacing any placeholders in the message template with values provided by the application business logic 422. The generated messages may be written by the message handler 418 to the message buffer 416. The message buffer 416 may store the generated messages until the message view controller 406 of the UI 404 retrieves all pending messages and outputs them on the UI 404.

The message view controller 406 may include a message aggregator 408. The message view controller 406 may determine how messages may be displayed. For example, in one embodiment, the message view controller 406 may read all pending messages from the message buffer 416 and display them on the UI 404 during a UI refresh cycle. The message aggregator 408 may group messages of the same type. For example, messages may be aggregated based on message IDs. That is, messages with same message IDs may be grouped together, with only the first one being displayed. By applying this grouping, the UI 404 does not display a long list of error messages of the same type if the application business logic 422 generates a lot of errors. Thus, the user 402 is not overwhelmed by the error messages. In one embodiment, mass error messages may be generated by the application business logic 422 when performing mass data processing, or error message analysis. In another embodiment, the error messages may be collected from different backend systems (e.g., different applications running on different machines). In one or more embodiments, the message aggregator 408 may be implemented in the UI technologies that improves existing UIs to become more user-friendly.

Figure 5:
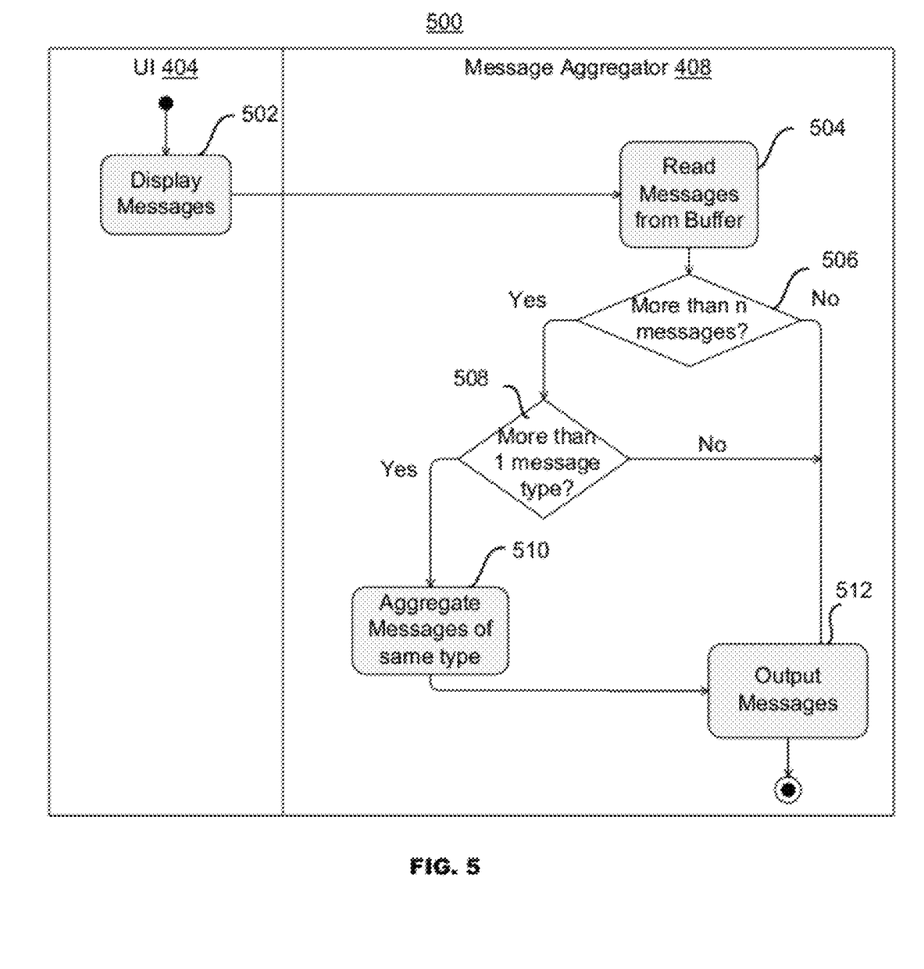
FIG. 5 illustrates a flow diagram of an exemplary message handling system according to an exemplary embodiment.

FIG. 5 illustrates a flow diagram representing an exemplary message handling process 500 of the exemplary message handling system 400. The message handling process 500 may be implemented by the UI 404 and the message aggregator 408 of the exemplary message handling system 400 shown in FIG. 4. The message handling process 500 may start at 502 when the UI 404 initiates an action to display messages. In one embodiment, the action may trigger a request to be sent to the message aggregator 408 during a UI refresh cycle. Upon receipt of the request, at 504, the message aggregator 408 may read messages from the message buffer (e.g., the message buffer 416 as shown in FIG. 4). Then at 506, the message aggregator 408 may determine whether the number of messages is more than a specific positive integer n. In one embodiment, the number n may be dynamically determined by the UI 404 based on current display area (e.g., window height, width, etc.) for messages. For example, the number n may be dynamically selected by the UI 404 such that a user does not need to scroll to see all messages being displayed. In another embodiment, the number n may be pre-determined, for example, 5 or 10.

If at 506 the message aggregator 408 determines that the number of messages is equal to or less than the number n, the message handling process 500 may proceed to 512, at which the message aggregator 408 may output the messages on a display. If, however, at 506 the message aggregator 408 determines that the number of messages is more than the number n, the message handling process 500 may proceed to 508, at which the message aggregator 408 may determine whether more than one type of messages need to be displayed. If all messages is of the same type, the message handling process 500 may proceed to 512 to output the messages. Determination of the message type may be based on message ID. If there is more than one type of messages, the message handling process 500 may proceed to 510 to aggregate the messages. For example, only the first message of each type may be kept for display and rest of the messages may be aggregated and hidden. After aggregation, the message handling process 500 may proceed to 512 to output the aggregated messages. In one embodiment, the first message of each type may be displayed with an indication to show that more messages of the same type is available if desired. The indication may be, for example, a hyper link, or a button.

Figure 6:
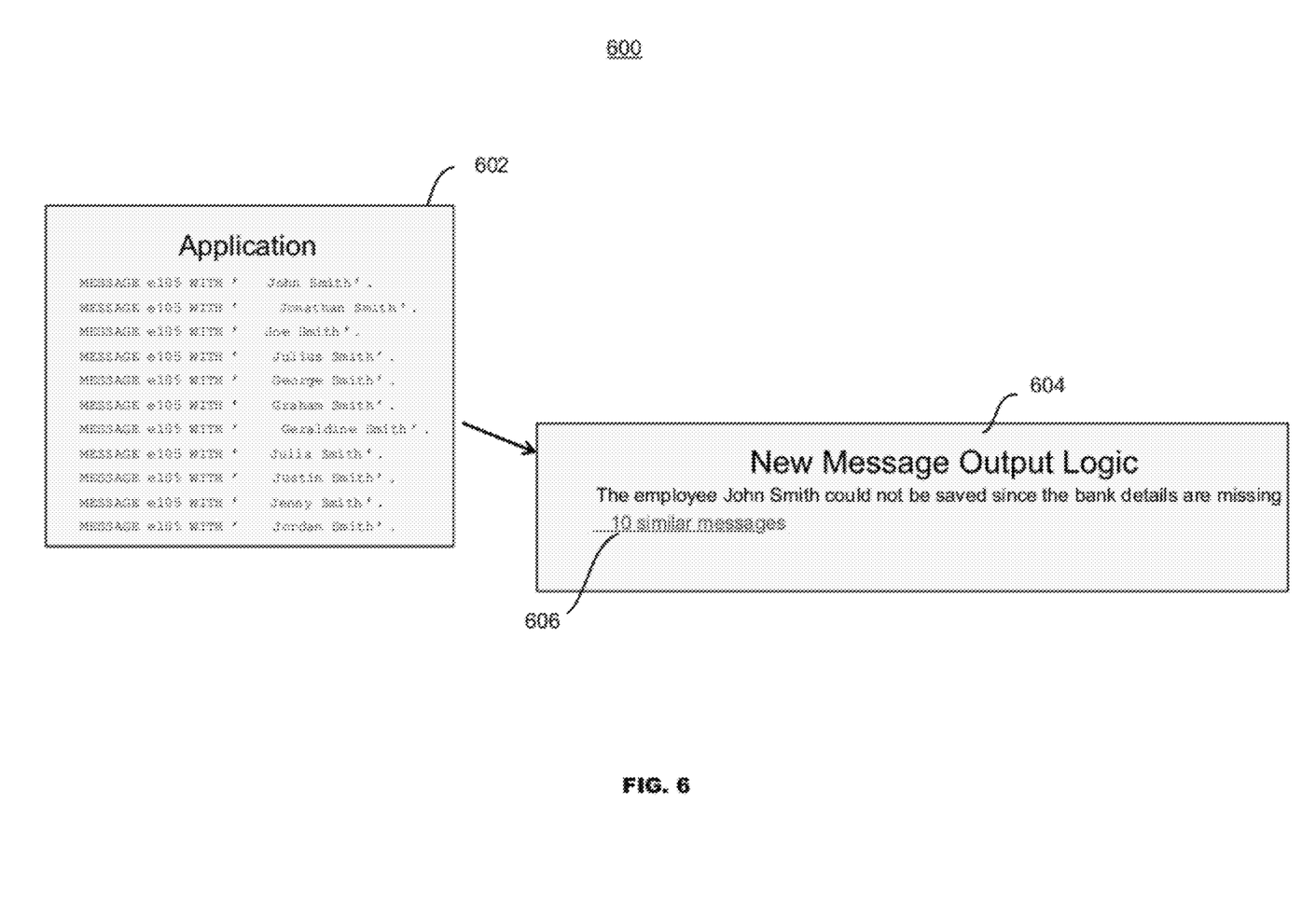
FIG. 6 illustrates an exemplary message display according to an exemplary embodiment.

FIG. 6 illustrates a message display 600 according to an exemplary embodiment. The message display 600 may comprise an application 602 that generates a lot of messages with the same message identifier (ID) "e105" and a new message output logic 604 that displays aggregated messages. As shown in FIG. 6, the application 602 may generate eleven messages. However, the new message output logic 604 may only display the first message and a link 606 for other messages. In comparison with FIG. 1, in which the traditional message output logic 104 displays all error messages in a long list, the link 606 hides all other similar messages and greatly reduces the display area needed for messages with same message ID (e.g., e105). If a—user is interested in seeing the other similar messages, the user can simply click on the link 606 to display them.

Figure 7:
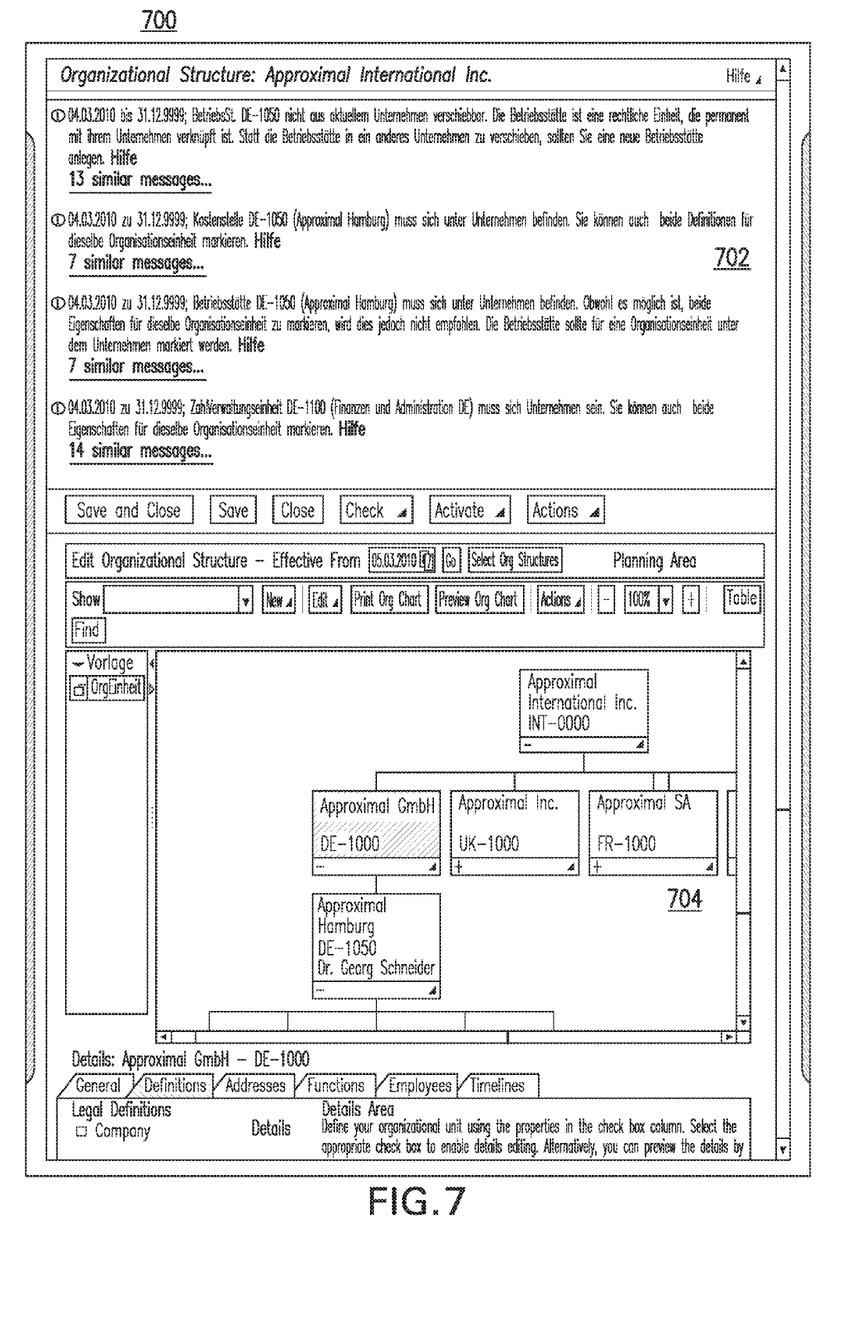
FIG. 7 illustrates an exemplary user interface of a system according to an exemplary embodiment.

FIG. 7 illustrates an exemplary user interface 700 of a message handling system according to an exemplary embodiment. The exemplary user interface 700 may be a user interface for an application for designing an organizational structure. The exemplary user interface 700 may comprise an upper pane 702 and a lower pane 704. The upper pane 702 may be a display area for messages. In embodiment, the messages may be grouped or aggregated. For example, as shown in FIG. 7, the upper pane 702 may display four aggregated groups of messages. Each aggregated group of messages is shown by a representative message (e.g., the first message of the group) and a link indicating other similar messages being grouped and hidden. The lower pane 704 may be a design area for an organizational structure. In contrast to the prior art display shown in FIG. 3, the list of error messages is shortened to fit into the upper pane 702 such that an administrator does not need to scroll down to see all types of messages. The short list of all types of messages including a representative message of each type may give a user a clean and clear presentation of system's operational status, and may be helpful for a user to identify the root cause. Thus, the embodiment may prevent the user from being overwhelmed by messages and provides a more pleasant user experience. Further, the embodiment may help the user to concentrate on finding the cause of the error messages instead of scrolling up and down in the message area among hundreds or even thousands of similar messages.

Figure 8:
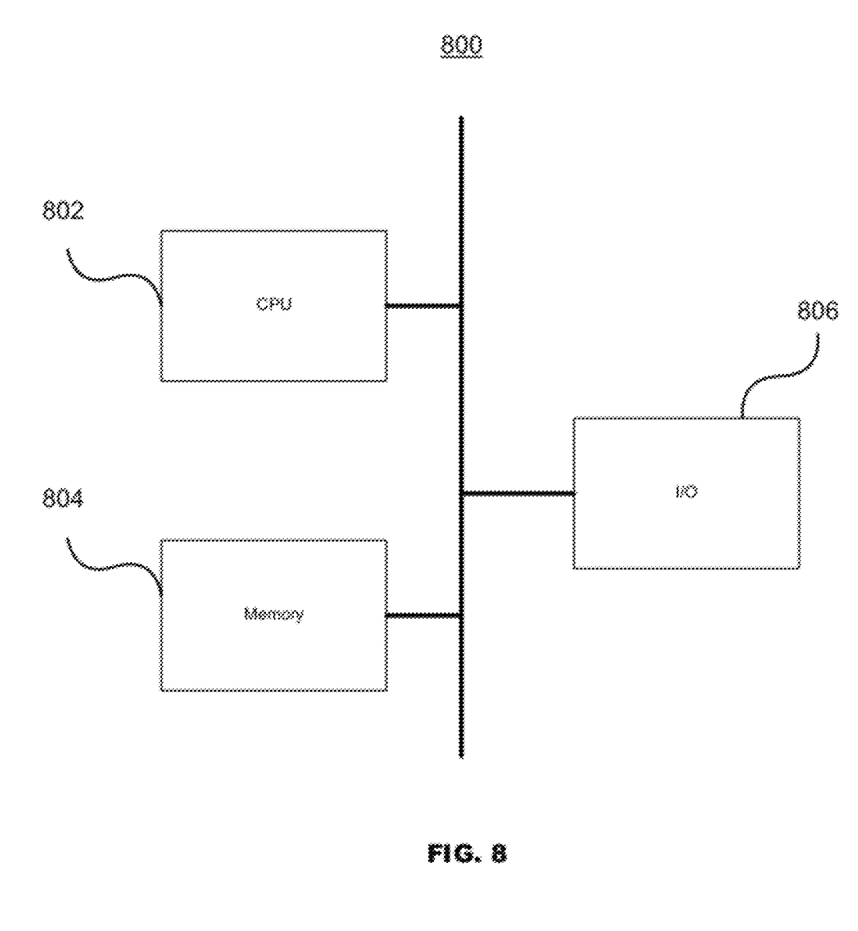
FIG. 8 shows a structure of a computer running a message handling system according to an exemplary embodiment.

FIG. 8 depicts a structure of a computer server 800 according to one embodiment of the invention. The computer server 602 includes a processor 802, memory 804, and an I/O device(s) 806. The processor 802 is connected to the memory 804 and I/O device(s) 806. These connections are direct or via other internal electronic circuitry or components.

The processor 802 is a programmable processor that executes instructions residing in the memory 804 to receive and send data via the I/O device(s) 806. The instructions may perform the operations of a message handling system according to an exemplary embodiment. The term programmable processor as used herein is any programmable microprocessor or processor or combination of microprocessors or processors that can operate on digital data, which may be special or general purpose processors coupled to receive data and instructions from, and to transmit data and instructions to, a machine-readable medium. According to one embodiment of the present invention processor 802 is an Intel microprocessor.

Memory 804 is a machine-readable medium that stores data that is processed by processor 802. The term machine-readable medium as used herein is any addressable storage device that stores digital data including any computer program product, apparatus and/or device (e.g., a random access memory (RAM), read only memory (ROM), magnetic disc, optical disc, programmable logic device (PLD), tape, hard drives, RAID storage device, flash memory or any combination of these devices). This may include external machine-readable mediums that are connected to processor 802 via one or more I/O device(s) 806.

The I/O device(s) 806 may be one or more input/output interfaces that receive and/or send digital data to and from an external device. Interfaces as used herein are any point of access to an external device where digital data is received or sent, including ports, buffers, queues, subsets thereof, or any other interface to an external device.

The exemplary method and computer program instructions may be embodied on a machine readable storage medium such as a computer disc, optically-readable media, magnetic media, hard drives, RAID storage device, and flash memory. In addition, a server or database server may include machine readable media configured to store machine executable program instructions. The features of the embodiments of the present invention may be implemented in hardware, software, firmware, or a combination thereof and utilized in systems, subsystems, components or subcomponents thereof. When implemented in software, the elements of the invention are programs or the code segments used to perform the necessary tasks. The program or code segments can be stored on machine readable storage media. The "machine readable storage media" may include any medium that can store information. Examples of a machine readable storage medium include electronic circuits, semiconductor memory device, ROM, flash memory, erasable ROM (EROM), floppy diskette, CD-ROM, optical disk, hard disk, fiber optic medium, or any electromagnetic or optical storage device. The code segments may be downloaded via computer networks such as Internet, Intranet, etc.

Although the invention has been described above with reference to specific embodiments, the invention is not limited to the above embodiments and the specific configurations shown in the drawings. For example, some components shown may be combined with each other as one embodiment, or a component may be divided into several subcomponents, or any other known or available component may be added. The operation processes are also not limited to those shown in the examples. Those skilled in the art will appreciate that the invention may be implemented in other ways without departing from the spirit and substantive features of the invention. For example, features and embodiments described above may be combined with and without each other. The present embodiments are therefore to be considered in all respects as illustrative and not restrictive. The scope of the invention is indicated by the appended claims rather than by the foregoing description, and all changes that come within the meaning and range of equivalency of the claims are therefore intended to be embraced therein.

What is claimed is:

1. A system for displaying messages in a structured way, comprising:
    a memory to store computer program instructions; and
    a processor configured to execute the computer program instructions to:
        store template messages in a table of a database;
        generate messages using the template messages;
        determine whether all of the generated messages can be viewed within a display area without vertical scrolling;
        if not all of the generated messages can be viewed within the display area without vertical scrolling, determine whether the generated messages are of more than one type;
        if the generated messages are of more than one type, group the generated messages based on message type; and
        display a list of the generated messages in a plurality of message groups, each message group being displayed with a representative message and a link to other generated messages in the message group;
        wherein the representative message and the respective linked other generated messages are generated from a same template message.

2. The system of claim 1, wherein the message type is indicated by message identifiers contained in each of the generated messages.

3. The system of claim 1, wherein at least one of the template messages contains a placeholder as a variable, the value of the variable is to be provided during run time when generating the message.

4. The system of claim 1, wherein the generated messages include warning messages, error messages, or both.

5. The system of claim 1, wherein the link includes information indicating the number of generated messages in the message group.

6. The system of claim 5, wherein the other generated messages are displayed on the display area when a user clicks on the link.

7. A non-transitory computer-readable storage medium embodied with program instructions for causing a computer to execute a method for displaying messages in a structured way, the method comprising:
    storing template messages in a table of a database;
    generating messages using the template messages;
    determining whether all of the generated messages can be viewed within a display area without vertical scrolling;
    if not all of the generated messages can be viewed within the display area without vertical scrolling, determining whether the generated messages are of more than one type;
    if the generated messages are of more than one type, grouping the generated messages based on message type; and
    displaying a list of the generated messages in a plurality of message groups, each message group being displayed with a representative message and a link to other generated messages in the message group;
    wherein the representative message and the respective linked other generated messages are generated from a same template message.

8. The non-transitory computer-readable storage medium of claim 7, wherein the message type is indicated by message identifiers contained in each of the generated messages.

9. The non-transitory computer-readable storage medium of claim 7, wherein at least one template message contains a placeholder as a variable, the value of the variable is to be provided during run time when generating the message.

10. The non-transitory computer-readable storage medium of claim 7, wherein the generated messages include warning messages, error messages, or both.

11. The non-transitory computer-readable storage medium of claim 7, wherein the link includes information indicating the number of generated messages in the message group.

12. The non-transitory computer-readable storage medium of claim 7, wherein the other generated messages are displayed on the display area when a user clicks on the link.

13. A computer-implemented method, the method comprising:
- storing template messages in a table of a database;
- generating messages using the template messages;
- determining whether all of the generated messages can be viewed within a display area without vertical scrolling;
- if not all of the generated messages can be viewed within the display area without vertical scrolling, determining whether the generated messages are of more than one type;
- if the generated messages are of more than one type, grouping the generated messages based on message type; and
- displaying a list of the generated messages in a plurality of message groups, each message group being displayed with a representative message and a link to other generated messages in the message group;

wherein the representative message and the respective linked other generated messages are generated from a same template message.

14. The computer-implemented method of claim 13, wherein the message types are indicated by message identifiers contained in each of the generated messages.

15. The computer-implemented method of claim 13, wherein at least one template message contains a placeholder as a variable, the value of the variable is to be provided during run time when generating the message.

16. The computer-implemented method of claim 13, wherein the generated messages include warning messages, error messages, or both.

17. The computer-implemented method of claim 13, wherein the link includes information indicating the number of generated messages in the message group.

18. The computer-implemented method of claim 17, wherein the other generated messages are displayed on the display area when a user clicks on the link.

19. The computer-implemented method of claim 14, wherein the message identifiers indicate a template message from which respective generated messages are generated, such that generated messages having a same message identifier are generated from a same template message.

20. The system of claim 2, wherein the message identifiers indicate a template message from which respective generated messages are generated, such that generated messages having a same message identifier are generated from a same template message.

* * * * *